Oct. 17, 1967  J. SINGER, JR  3,347,649
METHOD OF FUSING SINGLE LAYER FIBER OPTIC STRIP
Original Filed Aug. 13, 1962

JOSEPH SINGER JR.
INVENTOR.
BY Jacque L. Meister
AGENT.

United States Patent Office 3,347,649
Patented Oct. 17, 1967

3,347,649
METHOD OF FUSING SINGLE LAYER FIBER OPTIC STRIP
Joseph Singer, Jr., Arlington Heights, Ill., assignor to Chicago Aerial Industries, Inc., Barrington Village, Ill., a corporation of Delaware
Original application Aug. 13, 1962, Ser. No. 216,646, now Patent No. 3,272,063, dated Sept. 13, 1966. Divided and this application Apr. 28, 1966, Ser. No. 560,024
8 Claims. (Cl. 65—4)

This is a division of application Serial No. 216,646, filed August 13, 1962, now U.S. Patent No. 3,272,063 issued September 13, 1966.

This invention relates generally to light transmission devices and more particularly to fiber optic strips.

Many of the envisaged accomplishments of fiber optic technology lie in the area of scanning devices where the presence of fiber optic elements often enables a complete elimination of optical elements or alternatively, the accomplishment of technical objectives not feasible with conventional optical techniques alone. Scanning devices employing fused fiber optics can have their fiber optic elements broadly classified as either plates or strips; strips having a more limited image area that plates and having a higher width to thickness ratio of the image area than plates. One criteria for dividing plates from strips is an image area width to thickness ratio of ten or more.

In fiber optic scanning devices comprised of either plates, or strips, the common problem of resolution has been shared. In both plates and strips the resolution of an image in a static mode is strictly limited by fiber separation and detail smaller than this separation will not be resolved. Because of this resolution limit imposed by the fiber separation, efforts have been made to use smaller and smaller diameter fibers. In this regard, current commercial practice in the manufacture of fiber optic devices utilizes fibers between four and fifteen microns in diameter. Since micron size fibers are normally fabricated in a process known in the art as a multiple fiber redraw, it is not necessary to handle individual fibers of this size during the assembly operations for the fiber optic devices. The multiple fiber bundle is usually about 0.015 inch in diameter or larger and bundles this size can be handled rapidly and without undue breakage during assembly operations.

While there is no set limit on how small a fiber bundle can be when handled during assembly operations, after the bundles become smaller than about 0.015 inch both assembly time and breakage increase rapidly as bundle size is decreased. In fiber optic plates there is no need to handle small bundles since a plate in reality is nothing more than a large number of bundles fused together to form a larger bundle. However, the problem is entirely different in constructing fiber optic strips for scanning devices. In that class of device, the primary concern is the absolute thickness of the bundles comprising the strip and the diameter of the individual fibers comprising the bundle is secondary.

To improve the resolution of fiber optic strips, their manufacturers have resorted to handling smaller and smaller fiber bundles during strip assembly. Even though this is very costly in terms of both time and broken or misaligned fibers, strips of substantial width have been assembled from bundles as small as 0.008 inch in diameter. Additionally, some success had been achieved in drawing strips but such drawn strips due to limitations on drawing equipment size and the afore-mentioned breakage problems have not proved to be feasible to manufacture beyond a width to thickness ratio of about 20:1 and thinner than about 0.005 inch. In addition to the fragility problems, it has been found experimentally that whenever the width to thickness ratio of drawn strips has been much in excess of 20:1, individual cross sections of the strip have tended to take a sepentine or wavy shape that is extremely difficult to remove in later processing. The fabrication limit of about 20:1 in the width to thickness ratio of drawn strips was very much lower than desired or required for many scanning applications. In the majority of scanning applications it is usually desirable and often necessary to construct strips on the order of 0.001 inch thick and having a width to thickness ratio extending upward to several thousand to one. However, because of the above described problems such ratios and thicknesses have not heretofore been possible or practicable.

Accordingly it is an object of this invention to provide a fiber optic strip having a width to thickness ratio several orders of magnitude higher than heretofore possible.

Another object of this invention is to provide a fiber optic strip of unprecedented thinness.

Yet another object of this invention is to provide a unique construction of fiber optic strips embodying support means to enable production of thinner strips than heretofore possible.

A principal object of this invention is to provide fiber optic strip assemblies having an overall width to thickness ratio greater than heretofore obtainable in individual strips. Still further objects and features of the invention pertain to the particular structure, arrangements and processes whereby the above objects are attained.

The structure of the fiber optic strips in accordance with the preferred embodiment of the invention includes a pair of fiber optic support elements. These support elements generally have a very high attenuation to the radiation to be transmitted by the optical fibers with which they are associated. The support members each have a flat plane surface disposed parallel to each other and separated by a space into which optical fibers are inserted. After suitable fusion between the materials of the support and the optical fibers, the inventive structure results.

The above and other features of novelty which characterize this invention are pointed out with particularity in the claims annexed to and forming a part of this specification. For a better understanding of this invention, however, and its advantages, reference is made to the accompanying drawings and descriptive matter in which are illustrated and described several specific illustrative embodiments of the invention.

Figure 1:
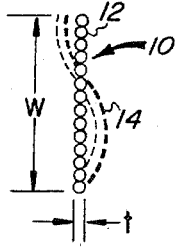
FIGURE 1 is a cross section of a fiber optic strip illustrative of the problems encountered with a high width to thickness ratio.

Referring now in detail to the drawing and specifically to FIGURE 1, thereof, there is shown a fiber optic strip of the type employed in the prior art. The strip is generally indicated at 10 and is comprised of a plurality of round optical fibers arranged with their axes parallel and with the fibers tangentially contiguous in a configuration having a width $w$ and a thickness $t$. The fibers 12 are coaxially and laterally fixed with respect to each other by any suitable fusing method. As illustrated in dotted outline at 14 for $w:t$ ratios on the order of 20:1, or more, the cross sections of the strip tend to assume a curved and generally serpentine form. The inventor has generally hypothesized that this deformation of the strip 10 is probably due to small variations in the coefficients of expansion between the many fibers in the strip, and that the tendency to deform is increased as the fibers' diameters are reduced and the number of fibers increased. In any event, because of handling problems, serpentine deformation of the fiber optic strips, and strip fragility whenever strip thickness went substantially below 0.005 inch; fiber optic strips have not been used in many applications that would otherwise be open to them.

Figure 2:
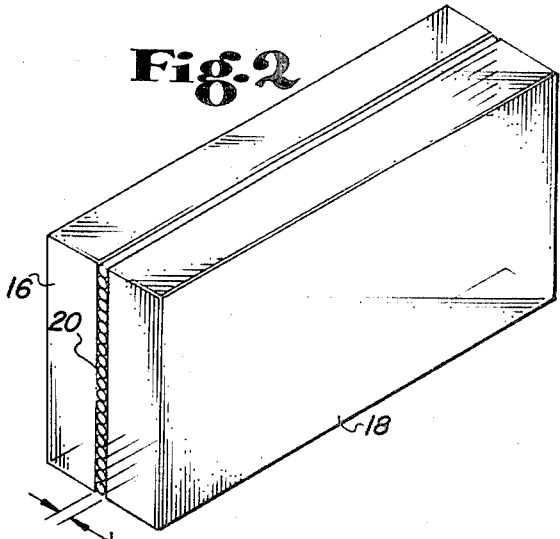
FIGURE 2 is illustrative of one of the types of construction used in the practice of the invention.

One of the many possible constructions that can be used to construct a fiber optic strip is illustrated in FIGURE 2 of the drawing. As there illustrated, two strip supporting members, 16 and 18 are employed. Each of the strip supporting members has at least one surface identical to a surface of the other supporting member. In the preferred practice of the invention the identical surfaces are flat. However, in certain applications the surfaces may be cylindrical. The only fixed requirement for the surfaces that will be disposed adjacent one another is that they either be identical or varied from identical by an amount equal to any change in diameter of the optical fibers to be positioned therebetween.

The supporting members 16 and 18 are positioned to have their identical surfaces spaced apart by the distances $d$ and are disposed locally parallel to each other and to the optical fibers as shown in the figure. The width $d$ is established in accord with the final thickness desired in the strip keeping in mind any reduction in size to be accomplished in the subsequent fusion-drawing operation and also considering any difficulties encountered in handling small fibers.

Positioned in the space $d$ between the parallel plane surfaces of the support members are a plurality of optical fibers 20. These optical fibers desirably are of the type generally known in the art as clad fibers, that is, fibers having a radiation transparent core surrounded by a transparent cladding or coating of some material having a different refractive index than the core material. The parallel condition of the plane surfaces of the support member is maintained by a fixture not shown in the drawing and not considered further herein since it forms no part of the present invention.

Advantageously the support members 16 and 18 consist of some material having a high capability for attenuating the radiation to be transmitted through the optical fibers. For the attenuation of visable light, a preferred material is the iron oxide bearing soda glass marketed under the trade name of "Athermal" by the German firm of "Schott." As will be apparent to those versed in the fiber optic art, whenever the final use of the strip subjects the strip to one or more bends, the support members need not be radiation attenuating since the radiation will be refractively effused at the bends.

An additional requirement placed on the material employed in the support members is that its coefficient of expansion be substantially the same or slightly less than the coefficient of expansion of the optical fibers to which it is later fused. When the coefficient of expansion of the support members is too high, the support members tend to shatter after fusion. Since low coefficients of expansion are often related to higher softening temperatures, too low a coefficient in the support member usually results in a distortion of the fibers to which they are fused. In the preferred practice of the invention the coefficient of expansion of the support members has been maintained between 90 and 100% of the coefficient of expansion of the optical fibers.

After assembling the members in the form illustrated in FIGURE 2 and while they remain clamped together in this form, the assembly is introduced into the furnace of a fiber drawing machine. After the temperature of the strip assembly has stabilized at the drawing temperature, the drawing operation is begun. The drawing temperatures employed vary between 800° and 1700° F. depending on the glasses used and the particular drawing process employed. A representative temperature and one frequently used, is 1400° F.

During the drawing operation, the original cross section of the material drawn is substantially reduced. The actual amount of cross section reduction depends on several factors including among others the final size desired, the materials comprising the strip assembly, and the general limits imposed by the drawing process itself. Generally, however, a dimensional reduction in one drawing operation to approximately $\frac{1}{10}$ that of the equivalent dimension in the strip assembly before drawing has been found advantageous and practicable although larger reductions have been accomplished. During the drawing process and as a result of both the temperatures employed and the mechanical pressures present during the drawing operation, the support members and optical fibers are fused together to form a coherent assembly that need no longer be clamped together to maintain the relationships established in the material before drawing. In other words, the fiber optic strip emerging from the drawing operation will appear substantially the same as it appeared before drawing but will be reduced in cross section. That is, the thickness of the fiber optic strip of FIGURE 2 is reduced along with the overall size of the assembly. For example, if the assembly is reduced to $\frac{1}{10}$ scale and if the thickness were 0.010 inch wide before drawing, the thickness of the strip after drawing would be 0.001 inch. It is a special feature of this invention that where a 0.001 inch thick fiber optic strip not employing the inventive support members was so fragile as to be almost useless, strips employing the inventive support members have their durability and strength so materially enhanced that for the first time strips of this thickness and thinner have become practical.

Another and important advantage realized when preparing fiber optic strips in accordance with the invention is the substantial reduction in the cost of the strips. As pointed out above, very small optical fibers are fragile and difficult to handle. However, prior to the instant invention when it was necessary to construct thin strips it was also necessary to handle fibers of substantially the same diameter as those desired in the finished strip. Between handling large numbers of small fibers and the breakage encountered due to the handling, costs were excessive. The inventive process of manufacturing fiber optic strips by enabling one to handle larger more rugged optical fibers during the strip assembly reduces both assembly time and breakage and thus reduces costs.

Besides achieving a more rugged thinner strip than heretofore possible, the invention also makes it possible to manufacture strips of unprecedented width to thickness ratios without encountering the serpentine condition illustrade in FIGURE 1. Simply increasing the width of the support members 16 and 18 allows the strip to be constructed wider while at the same time the presence of the support members in the finished assembly maintains the strip in its originally assembled form and prevents the introduction of the serpentine illustrated in FIGURE 1.

Figure 3:
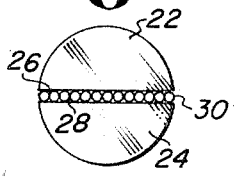
FIGURES 3, 4 and 5 are illustrative of other constructions employed in the practice of the invention and alternative to the construction of FIGURE 2.
Figure 4:
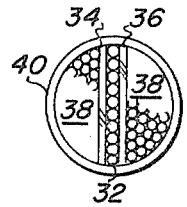

FIGURES 3 and 4 illustrate variations employed in the construction of the inventive optical fiber strip. In FIGURE 3, the support members 22 and 24 are sections of a cylindrical member such as might be made by slitting a rod lengthwise. Positioned between the plane surfaces 26 and 28 of the two support members 22 and 24 are the plurality of optical fibers 30 that will comprise the fiber optic strip after drawing and fusing of the assembly into a coherent bundle.

FIGURE 4 illustrates yet another construction employed in the manufacture of the inventive fiber optic strips. For various reasons but principally because of the ability to readily obtain glass tubing of various compositions and sizes, the construction of FIGURE 4 where a glass tube 40 is used as the holding fixture is the generally preferred construction and has been used in most of the production of the inventive strip assemblies to date. As illustrated in the figure, the optical fibers 32 that comprise the strip assembly are positioned between two support members 34 and 36. These in turn are positioned within the tube 40 and the remainder of the space within the tube filled with material which may comprise additional optical fibers of either attenuating or conducting material depending on the final form of the slit. As in the previously described embodiments, the assembly is fused into a coherent bundle and may be drawn to reduce its cross section.

While theoretically it is possible to make fiber optic strips as wide as desired when employing the inventive principles, in practice because drawing reduction ratios currently are limited at or near 10 to 1 by the oversize apparatus required for higher ratios, strip size has also been limited. This has resulted in an upper practical maximum of approximately 2½ inches in the width of the finished strip and a width to thickness ratio generally not exceeding 1000 to 1. Frequently however, it is desired to construct strips wider than this and it is a feature of this invention that such strips can be made employing an extension of the inventive principle. The detailed inventive method of constructing such wide strips is illustrated in FIGURES 5 and 6.

Figure 5:
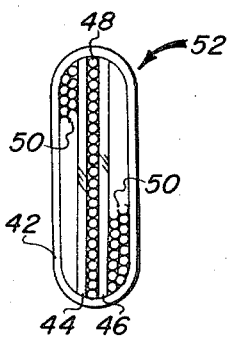
Figure 6:
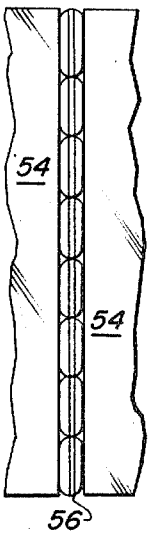
FIGURE 6 is a cross section view indicating one of the inventive methods of assembling the fiber optic strips of FIGURE 5.

FIGURE 5 is illustrative of a preferred construction of fiber optic strips used in constructing the multiple strip assembly of FIGURE 6. This embodiment is similar to that of FIGURE 4 but the sheathing tube 42 has had its cross section deformed to one having two parallel flat sides. For reasons brought out further below, the tube 42 is advantageously comprised of a borosilicate glass. Assembled within the tube are two radiation attenuating support members 44 and 46 between which are assembled the plurality of radiation conducting optical fibers 48 which comprise the radiation conducting portion of the finished fiber strip. In the space remaining within the confines of the tube 42, there is assembled filler material which may comprise a plurality of filler fibers 50. Depending on the end use of the strip, this filler material may or may not be radiation attenuating. The support members 44 and 46, the conducting fibers 48 and the plural fibers 50 are all composed of acid resisting glass such as the high lead or soda lime glasses.

After drawing and fusing the bundle 52 into its completed size, the strip 52 is placed in a hydrochloric acid bath to etch away the sheathing tubing 42 and thus form strip 56. Note that if the sheathing tubing 42 had not been etched away or otherwise removed, it would not be possible to abut the fibers 48 of adjacent strips 56. After the etching operation the strips 56 are assembled in the manner illustrated in FIGURE 6. As illustrated there, the strips 56 are arranged contiguous one another and with their conducting fibers 48 aligned and abutting. The strips 52 having their sheathing removed are designated by the reference numeral 56 in FIGURE 6. Supporting the plurality of strips 56 is either one or two support members 54. The support members 54 are fused to the plurality of strips 56 and the strips fused together to form the completed strip assembly. Ordinarily this fusion operation is accomplished in a furnace by the application of controlled heat without any further attempt being made to reduce the dimensions of the fiber optic elements. The furnace temperature used may vary between 1000 and 1600° F. depending on the glasses employed and whether or not mechanical pressures are applied.

From the foregoing it can be seen that simple and economical means and methods have been provided for accomplishing all of the objects and advantages of the invention. However, it should be apparent that many changes in the details of construction or steps in the methods may be made by those skilled in the art without departing from the spirit of the invention as expressed in the accompanying claims and the invention is not limited to the exact matter shown and described herein, as only the preferred matters have been given by way of illustration.

Having described my invention, I claim:

1. A process for manufacturing supported fiber optic strips, comprising the steps of
    arranging two support members each of which has a surface identical to a surface of the other, with their identical surfaces adjacent one another, locally parallel and defining a space of predetermined width $w$ and thickness $t$, where the ratio $w:t$ is at least 20:1, therebetween,
    positioning a plurality of optical fibers in a single layer in said space in tangentially contiguous relationship with their axes parallel to each other and to the surfaces which define said space, and
    fusing said support members to said plurality of optical fibers by heating said members and fibers to a temperature between their annealing and softening temperatures.

2. The process for manufacturing supported fiber optic strips in accordance with claim 1 wherein the step of fusing is conducted at a temperature controlled between 800 and 1700° F.

3. The process for manufacturing supported fiber optic strips in accordance with claim 1 wherein the step of fusing is conducted at a temperature controlled between 1000 and 1600° F.

4. The process for manufacturing supported fiber optic strips in accordance with claim 1 comprising the additional step of reducing strip cross section by drawing simultaneously with fusing of the elements.

5. In the method of constructing a fiber optic strip, the combination comprising the steps of
    selecting two support members each of which members has a surface identical to a surface of the other,
    positioning said two support members within a glass tube,
    arranging said two support members within said tube so that their identical surfaces are adjacent and locally parallel and define a space of predetermined width $w$ and thickness $t$ where the ratio $w:t$ is at least 20:1, therebetween,
    filling said space with a plurality of optical fibers, positioned tangentially contiguous to each other in a single layer with their axes parallel to each other and to the surfaces which define said space,
    filling any space remaining within said tube with filler material, and
    fusing together by heating above their annealing temperatures, said tube, said filler material, said support members and said plurality of optical fibers.

6. In the method of constructing a fiber optic strip, the combination comprising the steps of
    selecting two support members each of which members has a surface identical to a surface of the other,
    positioning said two support members within a glass tube,
    arranging said two support members within said tube so that their identical surfaces are adjacent and locally parallel and define a space of predetermined width $w$ and thickness $t$ where the ratio $w:t$ is at least 20:1 therebetween,
    filling said space with a plurality of optical fibers positioned tangentially contiguous to each other in a single layer with their axes parallel to each other and to the surfaces which define said space,
    filling any space remaining within said tube with filler material, and
    fusing together by heating above their annealing temperatures, said tube and the material positioned therein while simultaneously reducing its cross section by drawing.

7. In the method of constructing a fiber optic strip assembly, the combination comprising the steps of
    selecting two light attenuating acid resisting support members which each have a surface identical to a surface of the other, positioning said two support members within a borosilicate glass tube,
arranging said two support members within said tube so that their identical surfaces are adjacent and locally parallel and define a space of predetermined width $w$ and thickness $t$ where the ratio $w:t$ is at least 20:1, therebetween,
filling said space with a plurality of acid resisting radiation conducting optical fibers positioned tangentially contiguous one another in a single layer with their axes parallel to each other and to the surfaces which define said space,
filling any space remaining within said glass tube with acid resisting filler material,
fusing together said tube and the material positioned therein by heating them to a temperature between their annealing and softening temperatures, and
etching away said glass tube with hydrochloric acid.

8. A process for manufacturing a composite supported fiber optic strip comprising the steps of
selecting two light attenuating acid resisting support members which each have a surface identical to a surface of the other,
positioning said two support members within a borosilicate glass tube,
arranging said two support members within said tube so that their identical surfaces are adjacent and locally parallel and define a space of predetermined width $w$ and thickness $t$ where the ration $w:t$ is at least 20:1, therebetween,
filling said space with a plurality of acid resisting radiation conducting optical fibers positioned tangentially contiguous one another in a single layer with their axes parallel to each other and to the surfaces which define said space,
filling any space remaining within said glass tube with acid resisting filler material,
heat fusing together said tube and the material positioned therein, at a temperature in the range between their annealing and softening temperatures, acid etching away said glass tube,
repeating the foregoing steps to obtain a plurality of supported fiber optic strips,
positioning said plurality of supported strips adjacent one another and abutting with their conducting optical fibers aligned to form a composite fiber optic strip having a thickness $t$ and a width equal to the sum of the widths $w$ of said plurality of supported strips, wherein the width to thickness ratio of said composite strip is in excess of 40:1 upwards to several thousands to one,
assembling an outer support member on either side of said composite fiber optic strip and in touching and coextensive relation thereto, and
fusing said outer support members to said composite fiber optic strip at a temperature between 1000° F. and 1600° F. to form a composite supported fiber optic strip.

References Cited

UNITED STATES PATENTS 2,608,722   9/1952   Stuetzer.

OTHER REFERENCES

"Optica Acta," volume 7, No. 3, July 1960, pp. 201–217, Electro-Optical Systems Using Fiber Optics, by Kapany.

DONALL H. SYLVESTER, *Primary Examiner.*

F. W. MIGA, *Assistant Examiner.*